Jan. 17, 1950

L. K. ACHESON 2,494,981

SUCTION CLEANER

Filed July 26, 1943

INVENTOR.
Louis K. Acheson

BY
Harry S. Dumasse
ATTORNEY.

Jan. 17, 1950 L. K. ACHESON 2,494,981
SUCTION CLEANER
Filed July 26, 1943 2 Sheets-Sheet 2

INVENTOR.
Louis K. Acheson
BY
Harry S. Dunass
ATTORNEY.

Patented Jan. 17, 1950

2,494,981

UNITED STATES PATENT OFFICE 2,494,981

SUCTION CLEANER

Louis K. Acheson, North Canton, Ohio, assignor to The Hoover Company, North Canton, Ohio, a corporation of Ohio Application July 26, 1943, Serial No. 496,101

10 Claims. (Cl. 183—57)

The present invention relates to suction cleaners in general and more particularly to a new and novel filter-cleaning construction. More specifically, the invention comprises a suction cleaner in which the dirt-laden air stream is cleaned first by an initial dirt separator and secondly by a final dirt separator, new and novel means being provided to clean this final separator and to remove the collected foreign material therefrom and return it to the initial separator.

It is an object of the present invention to provide a new and improved suction cleaner. It is another object of the invention to provide a new and improved suction cleaner of the type incorporating an initial dirt separator, suction-creating means, a final dirt separator, in the order given, in combination with novel means to clean the final dirt separator and to remove the collected foreign material therefrom and return it to the initial separator. Still another object of the invention is to provide new and novel filter-cleaning means in a suction cleaner. A further object of the invention is to provide filter-cleaning means in a suction cleaner making use of both blowing and suction upon opposite sides of the filter. A still further object of the invention is to provide a suction cleaner in which a dirt filter is cleaned by suction nozzles which contact both sides thereof. Still another object of the invention is to provide a suction cleaner in which a filter is cleaned by passing a cleaning air stream therethrough in a direction reversed from the normal flow of air through the filter. These and other more specific objects will appear upon reading the following specification and claims and upon considering in connection therewith the attached drawings to which they relate.

Referring now to the drawings in which preferred embodiments of the present invention are disclosed:

The present invention is basically an improvement upon the cleaner disclosed and claimed in the patent to Bible 2,247,472. The same sequence of the functional operations during ordinary cleaning characterizes the present invention as characterizes the basic Bible invention. In the Bible patent construction when the final filter became sufficiently dirty as to require cleaning the connection of the ordinary dusting tool hose to the filter-cleaning nozzle effected the reversal of the flow of cleaning air through the final filter and its return to the initial separator. The same basic relationship exists in the present construction except that the cleaning of the final filter is made more complete by the provision, in the first embodiment of the invention, of positive pressure upon one side thereof and suction upon the other side. Bible relies upon suction only to perform the filter cleaning. In the second embodiment of the present invention, a suction nozzle is provided upon both sides of the final filter, whereas in the Bible patent construction there is a filter-cleaning nozzle upon one side of the filter only. While the means of obtaining the flow of air through the filter-cleaning nozzles in the present invention is similar to that taught in the Bible Patent 2,247,472 let it be understood, however, that it is within the scope of the invention to incorporate automatic valve means which would cause a flow of air through the filter-cleaning nozzles as taught, for example, in the co-pending application to Dale C. Gerber and Ralph C. Osborn, Serial No. 459,238, filed September 22, 1942 now Patent No. 2,387,655, dated October 23, 1945.

Figure 2:
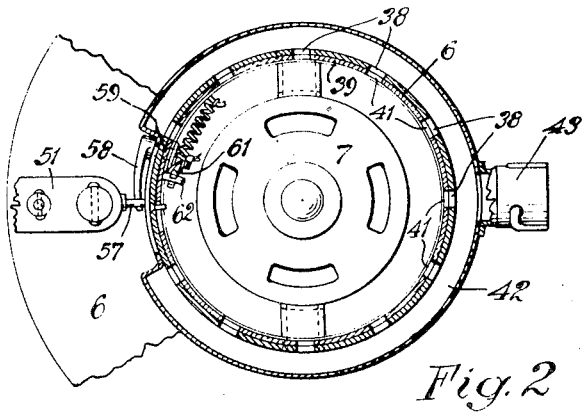
Figure 2 is a transverse section upon the line 2—2 of Figure 1 and shows the valve means which are effective to place an increased positive pressure upon one side of the filter in the filter-cleaning operation.
Figure 3:
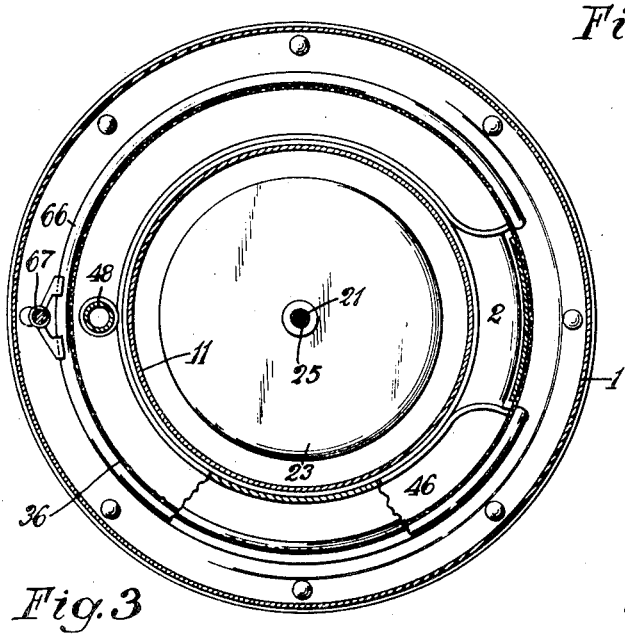
Figure 3 is a transverse section upon the line 3—3 of Figure 1.

Returning now to the drawings and to Figures 1 to 3 in particular, the first preferred embodiment of the invention is illustrated and is seen to comprise a main housing or casing 1 formed with an inwardly extending flange-like bottom plate 2 and which seats removably upon a base element 3 housing an open top dirt pan or container 4 sealed to the bottom plate 2. Pan 4 is removable in any suitable manner. The top of housing or casing 1 is closed by the motor hood or casing 6 which flares outwardly at its lower end and which houses the rotary driving motor 7. The shaft 8 of motor 7 depends downwardly into the housing 1 where it carries a pair of spaced fans 9.

The interior of casing 1 is divided into two functionally important divisions by a vertical cylindrical wall 11 which extends between the bottom plate 2 of the casing 1 and the top closure wall 12. The latter extends outwardly beyond the cylindrical wall 11 to be secured to the housing 1 at its rimmed peripheral edge.

The space within the cylindrical casing or wall 11 is divided into a whirl chamber 14 and into a fan chamber 16 by means of a horizontal wall 17 from the open center of which an intake sleeve 18 extends downwardly past mid-center in the whirl chamber 14. Spaced rigidly extending arms 19 in inlet 18 carry a vertical rod 21 which supports a strainer element 22 at the mouth of the inlet 18 and a circular plate 23 at the bottom of the whirl chamber immediately above the dirt container 4. Strainer 22 and plate 23 are spaced by a sleeve 25 enclosing rod 21 and are held in place by a manually removable thumb nut 24 which is screw-threaded upon the lower end of 21.

The fan chamber 16 is divided by a centrally ported multi-vaned stationary deflector 26 into first and second stages, each of which houses a fan 9. The first stage opens into the whirl chamber 14 through the inlet sleeve 18 and the second stage is provided with a plurality of exhaust ports 27 in the cylindrical wall 11.

The intake for the air entering the cleaner comprises a flanged inlet tube 29 which extends through an opening 31 in the housing 1 and which is fixedly secured to the tangentially extending inlet opening 32 in the casing 11. The space between the inner cylindrical casing 11 and the outer cylindrical casing 1 is divided into a final separator or filter chamber 33 and a discharge chamber 34 by a vertically extending cylindrical sleeve 36 of air-permeable filter material which is fixedly secured to the rimmed upper end of the casing 11 at the top and to the bottom plate 2 of casing 1 at the bottom. Air which is discharged from the exhaust ports 27 of the fan unit first enters the filter chamber 33 and then passes through the filter 36 into the discharge chamber 34. The discharge chamber 34 is connected at its upper end through ports 37 in the top wall 12 into the housing 6 surrounding the motor 7. Housing 6 is in turn provided with a plurality of peripherally disposed ports 38 which are adapted to be closed by the rotatable ring valve 39 slidingly supported adjacent the inner surface of the casing 6. Valve 39 is formed with a plurality of ports 41 which, in one position of the valve, are in alignment with the ports 38 and permit of the free passage of air through the motor housing 6 and into an enclosing surrounding ring-like passageway 42. The latter is provided with an exhaust port 43 similar to inlet port 29 so that it is adapted to receive and seat the cleaner end of a dusting tool hose when it is desired to use the machine as a blower.

The dirt-laden air stream which enters the whirl chamber 14 from the dusting tool hose and through the inlet 29 is almost entirely cleaned by the whirl action of the air in the chamber. The foreign material is deposited within the dirt container 4 positioned below the chamber. A very small percentage of the foreign material suspended in the air, however, will be drawn through the fan unit and will be exhausted into the filter chamber 33. From there, in its passage outwardly through the filter element 36, the suspended material will be removed and the entirely clean air will pass to the atmosphere through the motor housing 6.

In the first embodiment of the invention, the means by which the collected foreign material is removed from the filter 36 and reconveyed to the whirl chamber 4 comprises a combination of blowing and suction means. Within the chamber 33 and movable vertically for the entire height of the filter element 36 is a suction filter-cleaning nozzle 46 which is formed with a pair of spaced filter-contacting lips 47. Filter-cleaning nozzle 46 is connected to a horizontally extending handle conduit 51 by a rigid vertically extending pipe 48 which passes upwardly through the top of the filter chamber, through an air seal 49, and through the flanged lower end of motor casing 6. Conduit handle 51 is formed at its outer end similarly to the ports 29 and 43 and is adapted to receive a dusting tool hose connection. The dusting tool is indicated by the reference character 52 and is normally connected at one end to the intake port 29 and provided at its outer end with a cleaning nozzle 53. The latter is removed when it is desired to clean the final filter 36 and that end of the dusting tool hose is connected to the conduit 51. The suction of the suction-creating unit is then effective, in the filter-cleaning nozzle 46 to draw air through the filter element 36 in a direction opposite to that in which it normally passes therethrough, that is, as to that part of the filter contacted by the nozzle 46 the air passes from the discharge chamber 34 toward the filter chamber 33. When the filter is not being cleaned, a cap 54, attached to the side of the casing 1 by a suitable chain or wire 56, closes the conduit 51 in an obvious manner.

When the filter is being cleaned and the operator lifts the conduit handle 51 vertically upwardly, in order to move the filter-cleaning nozzle 46 over the filter 36, the initial movement of the conduit causes the rotation of the valve 39 which controls the flow of air through the discharge port 43. This is effected by means of a pin 57 which is carried by the conduit 51 and which moves from holding contact with an abutment 58 carried by a rotatable shaft 59 in the motor housing 6. From the rotatable shaft 59 extends a vertical lever 61 which at its bifurcated upper end contacts a second pin 62 fixed to the rotatable ring valve 39. A coil spring 63 between the lever 61 and the housing 6 at all times exerts a force upon the lever 61 which tends to hold it and the ring valve 39 in port-closing position. With the filter-cleaning nozzle 46 at the lower end of its stroke, the position it should be placed in during normal cleaning operation, the pin 57 holds the shaft 59 and lever arm 61 against the normal action of spring 63 and positions the valve 39 in port-open relationship.

With the filter-cleaning nozzle 46 in operation and the handle-conduit moved upwardly, the restraining force of the pin 57 on the abutment 58 is removed and, under the action of coil spring 63, lever 61 is pivoted and the ring valve 39 is moved to port-closing position. The air which is passing through the machine can then no longer pass through the motor housing 6 into the enclosing passageway 42 to be discharged through the exhaust port 43 to be discharged to atmosphere. It is confined and must make its way from the discharge passageway 34 by some other means. The only other possible pathway of escape is through the filter-cleaning nozzle 46 and, accordingly, the entire flow of air through the machine is passed through the filter-cleaning nozzle 46.

A further feature which improves the cleaning effectiveness of the filter-cleaning nozzle 46 is the presence of a pair of spaced filter-contacting retainer elements 66 which abut the exterior of the filter element 36 opposite that contacted by the lips 47 of the filter-cleaning nozzle 46. Elements 66 are supported and carried by a vertical shaft 67 which, similarly to the vertical pipe 48, extends upwardly to be fixedly connected at its upper end to the conduit handle 51. Accordingly it is seen that the filter-contacting spacer elements 66 are moved vertically with the conduit handle 51 and with the filter-cleaning nozzle 46, the relationship of the elements 66 to the filter 36 and to the lips 47 of the filter-cleaning nozzle being such that the filter 36 is held against the nozzle lips.

In the operation of this first embodiment of the invention in normal cleaning, the dirt-laden air stream enters inlet port 29 from the dusting tool unit and substantially all of the foreign material suspended in the air is separated therefrom by the whirl action within the whirl chamber 14. The foreign material falls under gravity into the dirt pan 4 while the cleaned air enters the fan unit through the inlet 18. The cleaned air passes through the fan unit and is exhausted into the final dirt separator or filter chamber 33 and passes outwardly therefrom through the filter element 36 into the discharge chamber 34. From the latter it escapes through the top ports 37 into the motor housing 6. Ring valve 39 being in the open position during normal cleaning, the air escapes from the motor housing 6 into the discharge port 43 and makes its way into the surrounding atmosphere. During normal cleaning the machine functions as described.

After an extended period of use, however, the fine dust which has escaped from the initial separator 14 and which has collected upon the final filter 36 increases the resistance to the flow of air of that element to a sufficient extent so as to decrease cleaner efficiency and to make it desirable to clean the filter in order to increase the flow of air through the machine. The operator then removes the cap 54 from the conduit handle 51, removes the nozzle 53 from the dusting tool hose 52 and attaches the end of the hose 52 to the conduit handle 51. The entire flow of air through the machine and into discharge chamber 34 is then returned from the discharge chamber 34 through the filter element 36 and into the filter-cleaning nozzle 46. From nozzle 46 it makes its way back through the vertical conduit pipe 54 into the dusting tool unit and back to the whirl chamber. When the operator begins to move the conduit handle 51 upwardly the valve 39 is moved to its closing position by the action of its spring 63, the pin 57 on the conduit handle no longer holding the abutment 58 down, and the escape of the air from the discharge chamber 34 into atmosphere through the motor housing is prevented. There then remains but one place for the air to go and that is back through the filter and into the filter-cleaning nozzle 46. The presence of the spacers 66 insures that at all times the filter at its point of contact with the filter-cleaning nozzle will make adequate contact therewith regardless of the pressure existing upon either side of that element.

Figure 1:
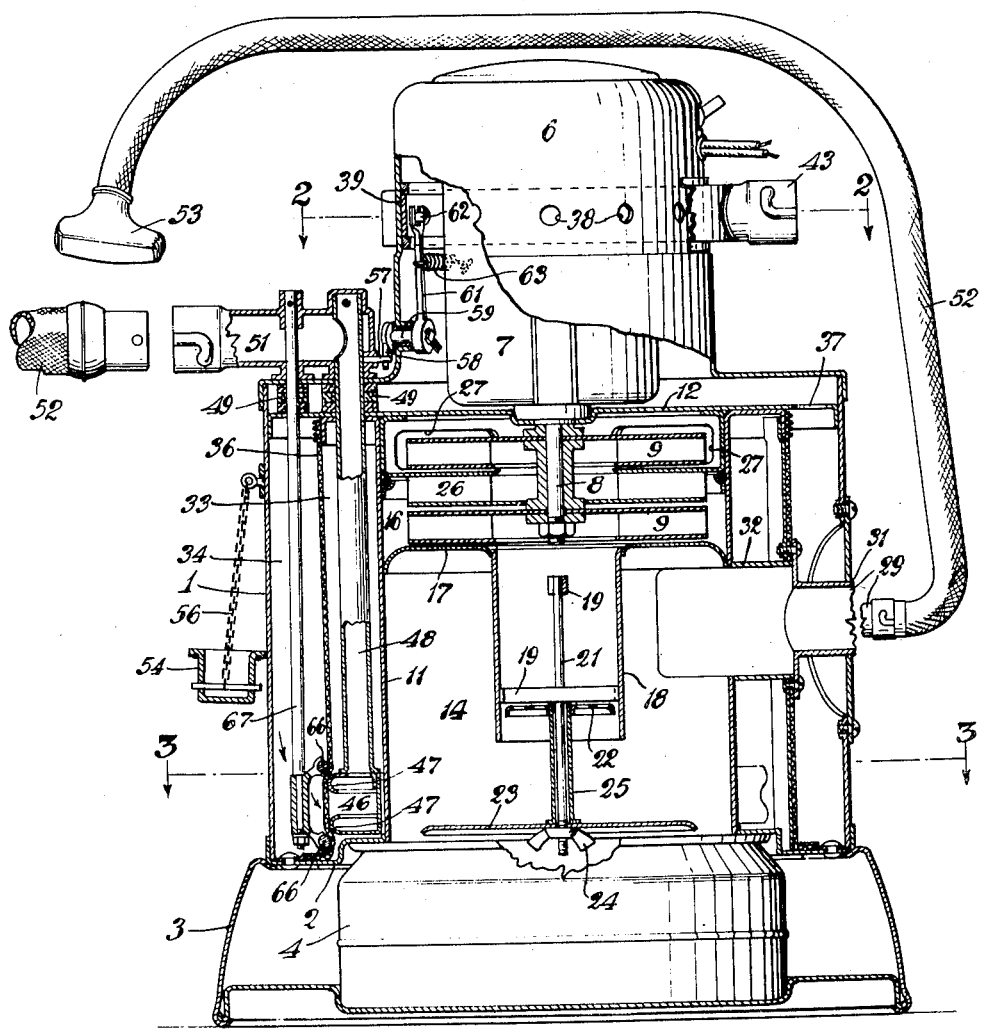
Figure 1 is a vertical section through a cleaner constructed in accordance with the first preferred embodiment of the invention.

The operator reciprocates the filter-cleaning nozzle several times in order to be sure that all of the collected foreign material is removed therefrom. Thereafter he returns the filter-cleaning nozzle to its original position, that in which the conduit handle 51 is as illustrated in Figure 1. The dusting tool hose is then disconnected, the cap 54 replaced, the nozzle 53 replaced from the end of the hose, and the machine is again ready for operation as a suction cleaner.

Figure 4:
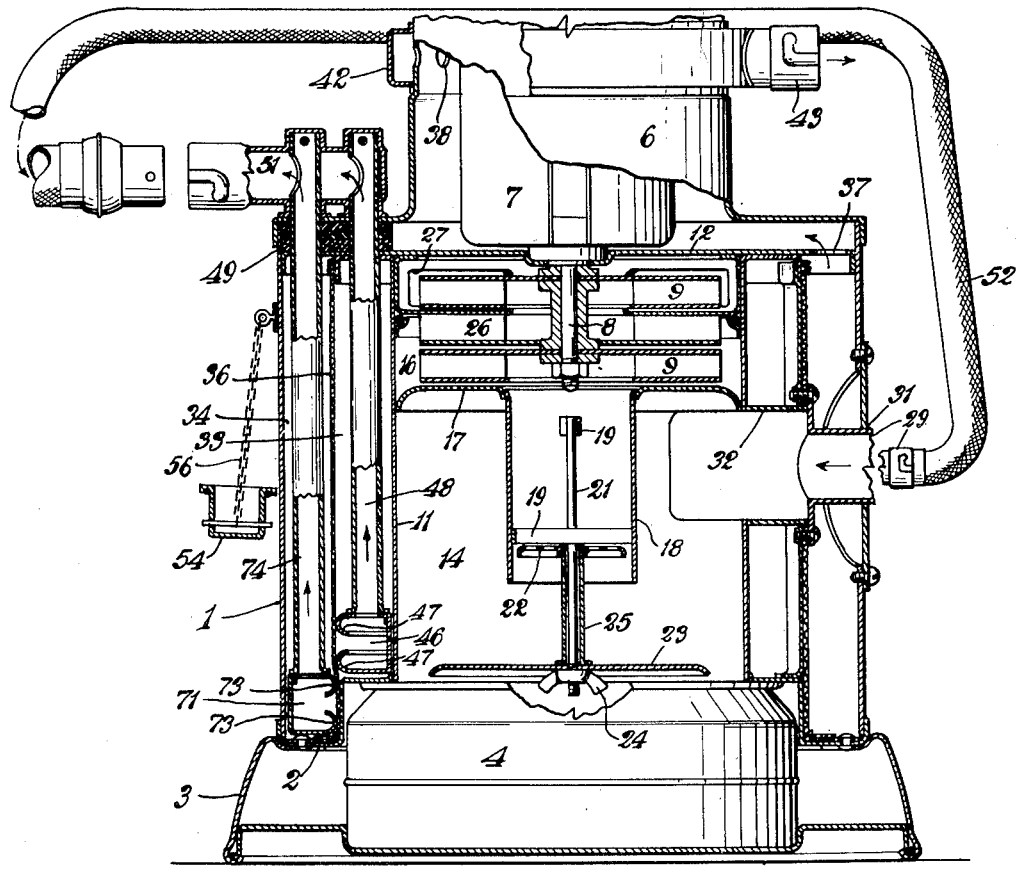
Figure 4 is a vertical section through a cleaner constructed in accordance with the second preferred embodiment of the invention.

Referring now particularly to Figure 4, the second preferred embodiment of the invention is illustrated. This embodiment is similar in its general construction to the first embodiment and differs therefrom fundamentally in that suction nozzles are provided upon both sides of the filter element 36 and there is no provision for a positive pressure upon the discharge side of the filter by means of closing off the normal exhaust outlet as in the first embodiment. Because of the fact that the two structures are fundamentally the same, the description of the entire unit will not be repeated.

The valve means which prevented the flow of air through the discharge port in the motor housing 6 in the first embodiment have been eliminated in this construction, together with the operating means therefor. Likewise eliminated are the spacer elements 66 which held the filter 36 against the lips 47 of the filter-cleaning nozzle 46 within the filter chamber 33. Those elements have been replaced by a second filter-cleaning nozzle here indicated by the reference character 71, and itself formed with spaced filter-contacting lips 73.

Filter-cleaning nozzle 71 though positioned within the discharge chamber 34 and upon the opposite side of the filter element 36 from the filter-cleaning nozzle 46, is also interiorly connected by a vertically extending pipe 74 with the conduit handle 51 as is the filter-cleaning nozzle 46. Nozzle 71 is positioned at a lower elevation than nozzle 46 and, in order to accommodate it in its lowermost position, the bottom plate 2 of the main casing 1 is formed in steps rather than substantially flat as in the first embodiment.

The operation of this second embodiment of the invention with the machine functioning as an operating suction cleaner is as described in connection with the first embodiment. Cleaning air enters the wihrl chamber and most of the foreign material suspended therein is removed. It is then drawn through the fan unit and exhausts into the final filter chamber 33 and all the remaining foreign material is removed from the air as it escapes through the filter 36 into the discharge chamber 34. From there it passes upwardly through the port 37 into the motor housing 36 and makes its way outwardly through the port 38 in the housing 6 into the surrounding main passageway 42 to be discharged therefrom at the port 43 into the surrounding air. When it is desired to clean the final filter the dusting tool hose is connected to the conduit handle 51 as described in connection with the first embodiment. In the present embodiment, however, part of the air is free to escape from the discharge housing 34, through the motor casing 6, and to the atmosphere. The suction within the whirl chamber 14 is made effective through the dusting tool hose 52 in both filter-cleaning nozzles 46 and 71. As the operator vertically reciprocates the conduit handle 51 both nozzles 71 and 46 move along the filter element 36 but upon opposite sides thereof. This insures that the foreign material will be completely removed, some of the material being closer to the exterior than to the interior of the filter element by virtue of the passage of a large quantity of air through that element over an extended period of time. The operator reciprocates the nozzles 46 and 71 several times and thereafter returns them to the normal inoperative position as shown in Figure 4. Thereafter, the removal of the dusting tool hose from conduit handle 51 and the replacement of the cap 54 thereon makes the machine ready for further cleaning.

I claim:

1. In a suction cleaner of the type including an initial dirt separator, suction-creating means to draw air through said initial dirt separator, a filter chamber connected to said suction-creating means to receive air therefrom, a discharge chamber surrounding said filter chamber and having an exhaust to atmosphere, and an air-permeable fixed flexible cylindrical filter forming a common wall of said filter and discharge chambers; a filter-cleaning nozzle in said filter chamber adapted to contact a limited portion only of said filter at one time, means mounting said nozzle for movement axially of said cylindrical filter in contact with the surface thereof, a filter-contacting element in said discharge chamber in contact with said cylindrical filter and positioned to hold same against said nozzle, and means to effect the simultaneous movement of said element in said discharge chamber and along said filter with said nozzle to improve the contact of said nozzle with said filter in all axial positions of said nozzle.

2. In a suction-cleaner, a filter, an exhaust passageway connected to said filter, suction-creating means exhausting through said filter and said passageway, a filter-cleaning nozzle movable in contact with the dirt laden side of said filter, means to connect said nozzle to a point of low pressure created by said suction-creating means, and means including valve means in said passageway to increase the pressure differential across said filter at said nozzle to increase the cleaning effectiveness thereof.

3. In a suction cleaner, a fixed filter, suction-creating means exhausting through said filter, a filter-cleaning nozzle movable in contact with the dirt laden side of said filter, means to connect said nozzle to a point of low pressure created by said suction-creating means, means to increase the pressure differential across said filter at said nozzle to increase the cleaning effectiveness thereof, and means movable with said nozzle and positioned upon the opposite side of said filter therefrom to hold said filter against said nozzle.

4. In a suction cleaner, a filter, suction-creating means to pass air through said filter, filter-cleaning nozzles upon opposite sides of said filter and movable relative thereto, and means to connect said nozzles to a point of reduced pressure to draw air therethrough.

5. In a suction cleaner of the type including an initial dirt separator suction-creating means to draw air through said initial dirt separator, a final dirt separator to receive air from said suction-creating means and including a filter, and an exhaust outlet; a filter-cleaning nozzle movable relative to said filter, air-conducting means to connect said nozzle to said initial dirt separator, means to close said exhaust outlet and to increase the air pressure upon the side of said filter opposite to that contacted by said nozzle, and means to move said last-mentioned means to closed position upon the movement of said nozzle to clean said filter.

6. In a suction cleaner of the type including an initial dirt separator and suction-creating means to draw air through said initial dirt separator; a final dirt separator to receive air from said suction-creating means and including a filter, filter-cleaning nozzles upon opposite sides of said filter, and air-conducting means to connect said nozzles to said initial dirt separator.

7. In a suction cleaner of the type including an initial dirt separator and suction-creating means to draw air through said initial dirt separator; a final dirt separator to receive air from said suction-creating means and including a cylindrical filter, axially spaced circularly extending filter-cleaning nozzles in contact with the inner and outer surfaces of said filter and movable axially relative thereto, and air-conducting means to connect said nozzles to said initial dirt separator.

8. In a suction cleaner, a filter, suction creating means to pass air through said filter, filter cleaning nozzles upon opposite sides of said filter and movable relative thereto, said nozzles being so arranged with respect to each other to urge said filter against each other, and means to connect said nozzles to a point of reduced pressure to draw air therethrough.

9. In a suction cleaner, a filter, suction creating means to pass air through said filter, filter cleaning nozzles upon opposite sides of said filter and movable relative thereto, said nozzles having filter engaging portions extending toward each other to hold said filter therebetween, and means to connect said nozzles to a point of reduced pressure to draw air therethrough.

10. In a suction cleaner, a filter, suction creating means to pass air through said filter, filter cleaning nozzles upon opposite sides of said filter and movable relative thereto, said nozzles being arranged in tandem on opposite sides of said filter, and means to connect said nozzles to a point of reduced pressure to draw air therethrough.

LOUIS K. ACHESON.

REFERENCES CITED

The following references are of record in the file of this patent:

UNITED STATES PATENTS

| Number | Name | Date |
|---|---|---|
| Re. 22,336 | Bible | June 22, 1943 |
| 1,493,789 | Mullen | May 13, 1924 |

FOREIGN PATENTS

| Number | Country | Date |
|---|---|---|
| 16,392 | Great Britain | July 17, 1911 |
| 353,837 | Great Britain | Jan. 21, 1930 |
| 554,893 | Germany | July 15, 1932 |